US010660252B2

(12) United States Patent
Akhter

(10) Patent No.: US 10,660,252 B2
(45) Date of Patent: May 26, 2020

(54) SOIL CONSERVING SHOVEL, GRATE ATTACHMENT, GARDEN TOOL SHOVEL ASSEMBLY, AND METHOD OF USE

(71) Applicant: Tracey Tools LLC, Buford, GA (US)

(72) Inventor: Amar David Akhter, Buford, GA (US)

(73) Assignee: Tracey Tools LLC, Buford, GA (US)

( * ) Notice: Subject to any disclaimer, the term of this patent is extended or adjusted under 35 U.S.C. 154(b) by 0 days.

(21) Appl. No.: 16/167,487

(22) Filed: Oct. 22, 2018

(65) Prior Publication Data

US 2019/0116712 A1    Apr. 25, 2019

Related U.S. Application Data

(60) Provisional application No. 62/575,596, filed on Oct. 23, 2017.

(51) Int. Cl.
*A01B 1/02* (2006.01)
*A01B 1/20* (2006.01)
*B07B 1/02* (2006.01)
*A01B 1/08* (2006.01)

(52) U.S. Cl.
CPC .............. *A01B 1/022* (2013.01); *A01B 1/024* (2013.01); *A01B 1/08* (2013.01); *A01B 1/20* (2013.01); *B07B 1/02* (2013.01)

(58) Field of Classification Search
CPC .. A01B 1/02; A01B 1/022; A01B 1/08; A01B 1/20; A01B 1/024; B07B 1/02; F24B 15/08
USPC ...................... 294/51, 59, 179; 209/417–419
See application file for complete search history.

(56) References Cited

U.S. PATENT DOCUMENTS

| 913,350 | A | * | 2/1909 | Baylis | |
|---|---|---|---|---|---|
| 1,175,192 | A | * | 3/1916 | Tankersley | A47G 21/001 294/131 |
| 1,341,874 | A | * | 6/1920 | Bandini | F24B 15/08 209/419 |
| 1,409,572 | A | * | 3/1922 | Quinn | F24B 15/08 209/419 |
| 1,619,266 | A | * | 3/1927 | Miller | F24B 15/08 209/419 |
| 1,675,092 | A | | 6/1928 | Cipriano | |
| 1,710,204 | A | | 4/1929 | Cipriano | |
| 2,005,416 | A | * | 6/1935 | Fisher | F24B 15/08 209/418 |

(Continued)

OTHER PUBLICATIONS

Doc Montana; "Survival Gear Review: Crovel Elite", survivalcache.com/survival-gear-review-crovel-elite-bug-out-bag-shtf-tool/ (webpage), publication date: May 24, 2015 (Wayback Machine Archive) retrieved on Oct. 22, 2018.

(Continued)

*Primary Examiner* — Dean J Kramer
(74) *Attorney, Agent, or Firm* — Silver Legal LLC; Jarrett L. Silver

(57) ABSTRACT

A soil conserving shovel and grate attachment that aid a user in removing and reclaiming soil from a recently removed plant by abrading the plant's rootball back and forth against the shovel and apparatus. In addition, methods of using a shovel and grate attachment instruct a user how to efficiently reclaim soil from a plant rootball. Also described is a method of manufacturing a shovel or grate attachment that can be used for rootball thinning.

19 Claims, 10 Drawing Sheets

(56) References Cited

U.S. PATENT DOCUMENTS

| | | | | |
|---|---|---|---|---|
| 2,432,643 | A * | 12/1947 | Wotring | A01D 9/00 294/51 |
| 3,627,368 | A * | 12/1971 | Baughman | E01H 1/12 294/176 |
| 3,851,763 | A | 12/1974 | Ball et al. | |
| 4,520,621 | A * | 6/1985 | Archer | A01D 11/00 56/400.01 |
| 4,828,690 | A * | 5/1989 | Montez | B07B 1/02 209/418 |
| D328,016 | S | 7/1992 | Valerio | |
| 5,306,061 | A | 4/1994 | Ives | |
| D363,862 | S | 11/1995 | Lusignan | |
| 5,601,325 | A | 2/1997 | Sokaski | |
| 7,878,334 | B2 | 2/2011 | Tucker | |
| 8,016,118 | B2 * | 9/2011 | Boll | E02F 3/02 209/417 |
| 9,289,800 | B1 | 3/2016 | Rosado | |
| D767,349 | S | 9/2016 | Pokraka | |
| 9,723,771 | B2 * | 8/2017 | Bessette | A01B 1/02 |
| 2008/0143127 | A1 | 6/2008 | Klangos | |
| 2009/0084563 | A1 | 4/2009 | Amanda | |
| 2010/0263346 | A1 * | 10/2010 | Westgarde | A01D 7/00 56/400.04 |
| 2013/0056397 | A1 * | 3/2013 | Geller | B07B 1/04 209/352 |
| 2015/0190846 | A1 | 7/2015 | Heim | |

OTHER PUBLICATIONS

"Crovel Survival Tool", http://wiki.tripwireinteractive.com/index.php?title=Crovel_Survival_Tool (webpage); publication late: Apr. 25, 2018 (Wayback Machine Archive) retrieved on Oct. 21, 2018.
Blackbradfiz, "Crovel (CrowBar / Shovel) [LowPoly | 2K]", libertycity.net/files/gta-5/98565-crovel-crowbarshovel-lowpoly-2k.html (webpage), publication date: Oct. 22, 2016.

* cited by examiner

SOIL CONSERVING SHOVEL, GRATE ATTACHMENT, GARDEN TOOL SHOVEL ASSEMBLY, AND METHOD OF USE

CROSS REFERENCE TO RELATED APPLICATION

This application is based on and claims the benefit of priority to U.S. provisional patent application Ser. No. 62/575,596 filed on Oct. 23, 2017.

INCORPORATION BY REFERENCE

The entire contents of U.S. provisional patent application Ser. No. 62/575,596 including the specification, claims and drawings is incorporate herein in their entirety.

TECHNICAL FIELD

The present disclosure relates to shovel systems and gardening tool modifications for reclaiming soil and debris from the rootball of plants.

BACKGROUND

The basic shovel has been in use for much of recent history. The shovel's primary usage has been for digging and scooping. Various industries have seen different shovel embodiments tailored to the specific needs of the industry. In the field of gardening, gardeners use shovels to dig and fill holes, extract plants or weeds out of the ground, and to do other things.

In expired U.S. Pat. No. 3,851,763 to Ball et al., an attachment to a shovel contains a screen used to sift or separate different particulate sizes. The shovel user in the '763 patent uses a shovel spade to lift up the particulate matter and then shakes the shovel to separate out the particulate matter. In U.S. Patent Application Publication No. 2009/0084563 A1 to Simmonds, a shovel blade has a plurality of holes in it from which the user is intended to use to shake the shovel to separate soil from rocks and debris. U.S. Pat. No. 9,289,800 to Rosado disclose a scooper has a screen in it to sift or separate different sized matter.

SUMMARY

Each time a gardener uses a shovel to dig up and extract a targeted plant from the ground ("targeted digging site"), the gardener drives the shovel blade into the ground. The front side of the shovel blade faces the plant to be removed and the center of the eventual hole that is left in the ground. Once the plant has been extracted, it is typical to find compacted together with the plant's root system an aggregation of soil, sand, debris and other matter (collectively "soil") at least partially embedded in and compacted to the plant's root system (a "rootball").

Herein described is an exemplary shovel for a gardener dig up a plant using the shovel or pull it out using only his or her hands, to easily remove from the roots of extracted plant the rootball and reclaim the soil therein by moving the rootball back and forth along a grate while applying pressure along a grate on the tool ("rootball thinning motion"). The compacted soil in the rootball abrades off of the rootball from the rootball thinning motion. In this way, the user can continuously extract soil from the rootball ("reclaimed soil") until the rootball is no longer a rootball and substantially only the roots are left. The reclaimed soil that was conserved prior to discarding the plant with rootball may be collected on the front side of the shovel blade and may then be used to backfill the hole in the ground making the hole significantly smaller.

In contrast, the teachings of the '763 patent, the '800 patent, and the '563 application, mentioned above, teach the concept of sifting to separate out particulate matter of difference sizes but would be ineffective to efficiently remove soil that is clumped in a plant's rootball. None of them teaches the concept of grating a rootball or an aggregated, compacted mass of material.

A first example embodiment is a soil conserving shovel including a garden tool shaft; a blade including a shaft end that is connected to a garden tool shaft, a front side that faces a targeted digging site during a shovel digging motion, and a blade tip usable for digging; and a grate connected to the shovel and positioned more proximal to the shaft end than the blade tip, wherein the grate is configured to mechanically separate debris from a rootball during a rootball thinning motion performed on the grate, the grate positioned relative to a front side of the blade so that the debris separated during the rootball thinning motion falls through the grate onto the front side of the blade. This shovel may optionally include other features such as the grate being convex against where the rootball thinning motion is to be performed. Another variation is a garden tool shaft connection configured to physically connect the garden tool shaft to the blade, the grate, or both. Another variation is where the grate includes a kickplate at a distal-most edge of the grate, with respect to the blade tip, configured to receive a force exerted by a foot of a user to assist the user with the shovel digging motion. Another variation is the grate not contacting the ground during the shovel digging motion.

Another example embodiment is a grate attachment including a grate. The grate includes a connector and a grating area; the connector being physically connectable to a shaft of a soil-displacing garden tool that includes a specialized end for displacing soil or cutting plant roots and the shaft extending from the specialized end, the grate being immobilized when the connector is connected to the shaft and configured to separate debris from a rootball when the plant rootball is abraded against the grate; and the grating area has an abrading surface against where the plant rootball is thinned.

Other example embodiments are the grate attachment including the abrading surface is convex relative to the shaft, includes intermittent slats with slits in between adjacent slats, is a mesh, an expanded metal or a perforated sheet, corrugated metal, and/or is curved about an imaginary line perpendicular to the shaft, wherein the imaginary line is optionally curved to wrap around at least part of the shaft.

Other example embodiments include the connector being a collar that circumferentially surrounds a majority of the shaft portion, and optionally including at least one mechanical feature configured to prevent the collar from rotating around the shaft and moving along the shaft. Further example embodiments include a connector being welded to the grate, being adhesively set for preventing the collar from rotating around the shaft and moving along the shaft, and/or being a bolt or rivet that at least partially inserts into the body of the shaft.

Another example embodiment is a garden tool shovel assembly including one of the grate attachments herein coupled to a shovel blade and/or a shaft. This example may further include the grate attachment being welded, fastened or adhered to the shovel blade and/or the connector being adhesively set for preventing the collar from rotating around the shaft and moving along the shaft.

Another example embodiment is a soil conserving shovel including a garden tool shaft; a blade including a collar at a shaft end of the blade that connects the blade to the garden tool shaft, a front side that faces a targeted digging site during a shovel digging motion, and a blade tip usable for digging; a grate connected to the shaft end and having at least portion that overhangs the axis of the shaft, the grate including an abrading surface overhanging the shaft and not in direct contact with the shaft or the collar, and grate supports extending from collar to the overhanging portion of the grate. This example embodiment may further include a kickplate at the most overhanging part of the grate that a user kicks during a digging motion and/or second grate supports extending from outer edges of the side of the blade to the overhanging portion of the grate.

Also described herein is an example embodiment is a method of manufacturing a soil retaining shovel, the method including the steps of attaching a blade and a shaft to the shovel; securing a grate to the blade, the shaft or both so that the grate is immobilized relative to the shaft and configured to mechanically separate debris from a rootball during a rootball thinning motion performed on the grate. Another example is when the step of securing the grate includes welding, fastening or adhering the grate to the blade, the shaft, or both. Another example of the method includes a step of supporting the grate by welding, brazing, fastening and/or adhering supports from the blade, the shaft or both to the grate. Another example includes the step of securing the grate involves positioning the grate so that debris separated during the rootball thinning motion falls through the grate onto a side of the blade that faces a targeted digging site.

Also described herein is a method of use of the shovel, the method including the steps of: holding a shovel including a blade and a grating area, the grating area being fixed and immobilized over a targeted digging site side of the blade; and thinning a plant rootball against the grating area so that debris separated during the rootball thinning motion falls through the grating area onto the targeted digging site side of the blade.

BRIEF DESCRIPTION OF THE DRAWINGS

The accompanying drawings, which are incorporated in and constitute a part of this specification, illustrate examples, and together with the description, serve to explain the principles.

DETAILED DESCRIPTION

A goal of the shovel, apparatuses, and methods herein is for a user to be able to efficiently extract reclaimed soil from a rootball using a rootball thinning motion. This reclaimed soil is root free, microbe rich soil that is immediately ready for reuse, and it can be collected in seconds. Another goal is that the economic costs and carbon footprint of the reclaimed soil are respectively free and zero for the user compared with bringing a bag of soil from soil source to the target site through packaging and a logistics supply chain. The embodiments herein are much more economically friendly and reduce waste compared with the use of an ordinary shovel and a trip to a gardening supply store. A further goal is to reduce waste disposal of whole rootballs that would ordinarily be discarded by a shovel user. A further goal is to adapt an ordinary garden tool with the grate attachment such as a rake or a wheelbarrow to create a soil conserving utensil.

Figure 1:
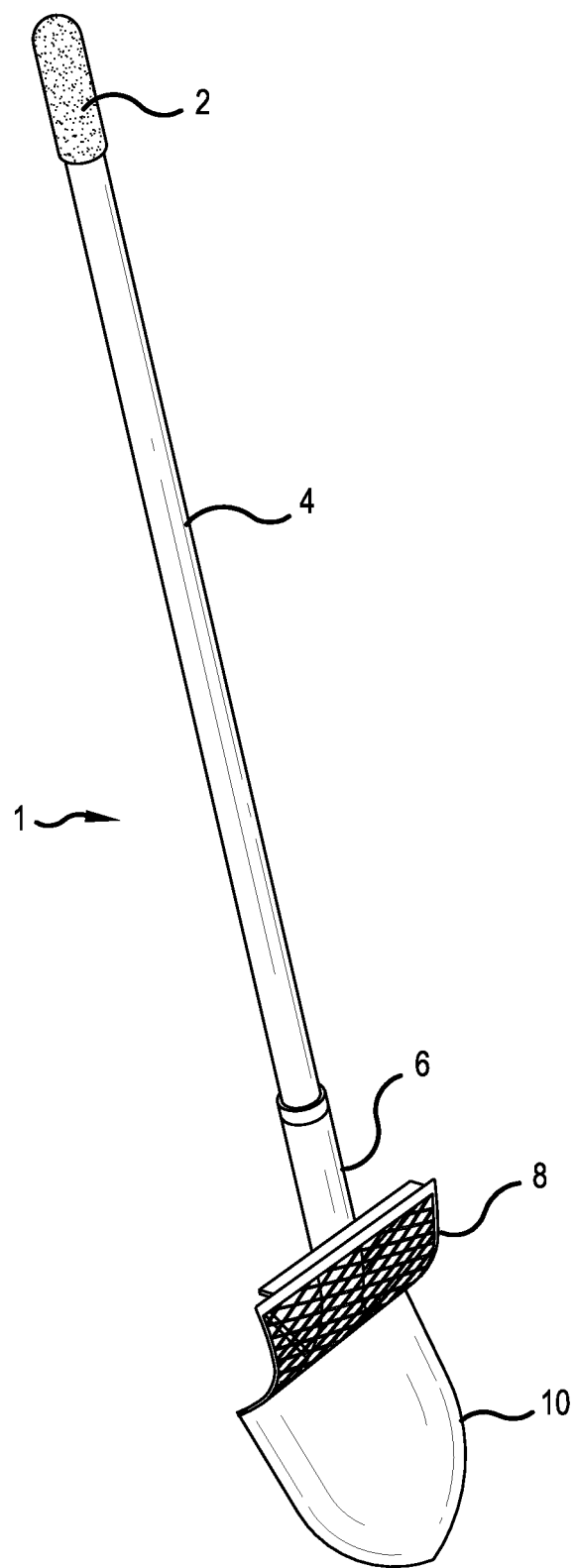
FIG. 1 is a perspective view of a shovel with grate embodiment example from the front and above the shovel.
Figure 2:
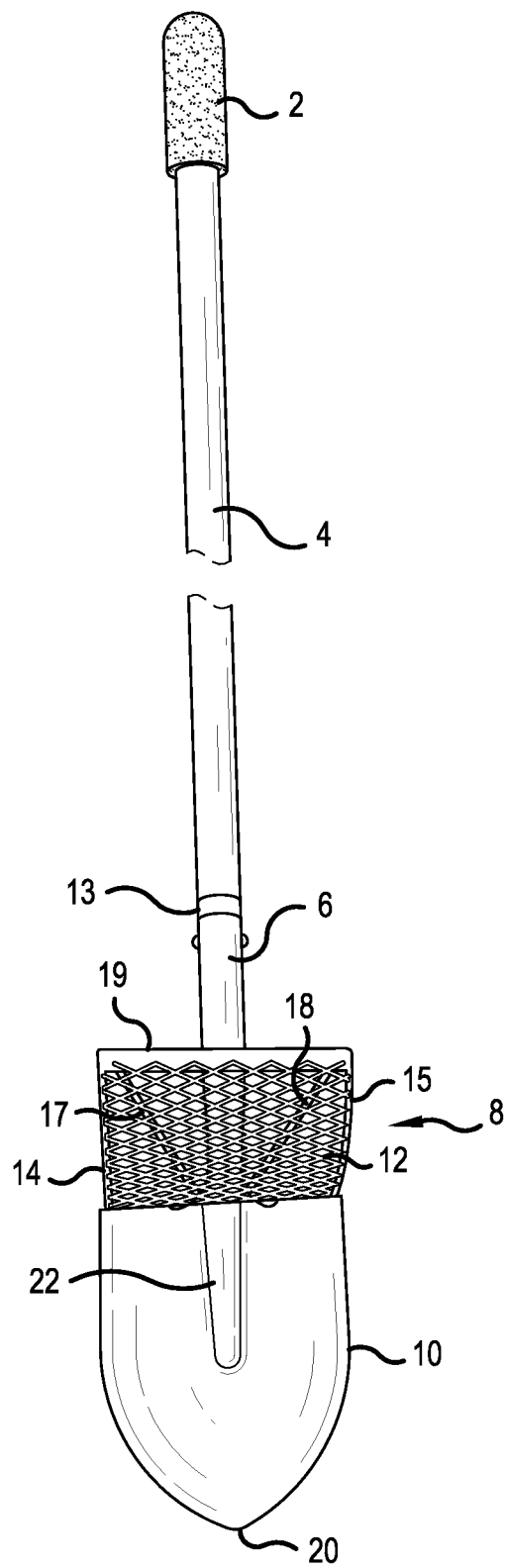
FIG. 2 is a front perspective view of the shovel grate and blade in the same embodiment.
Figure 3:
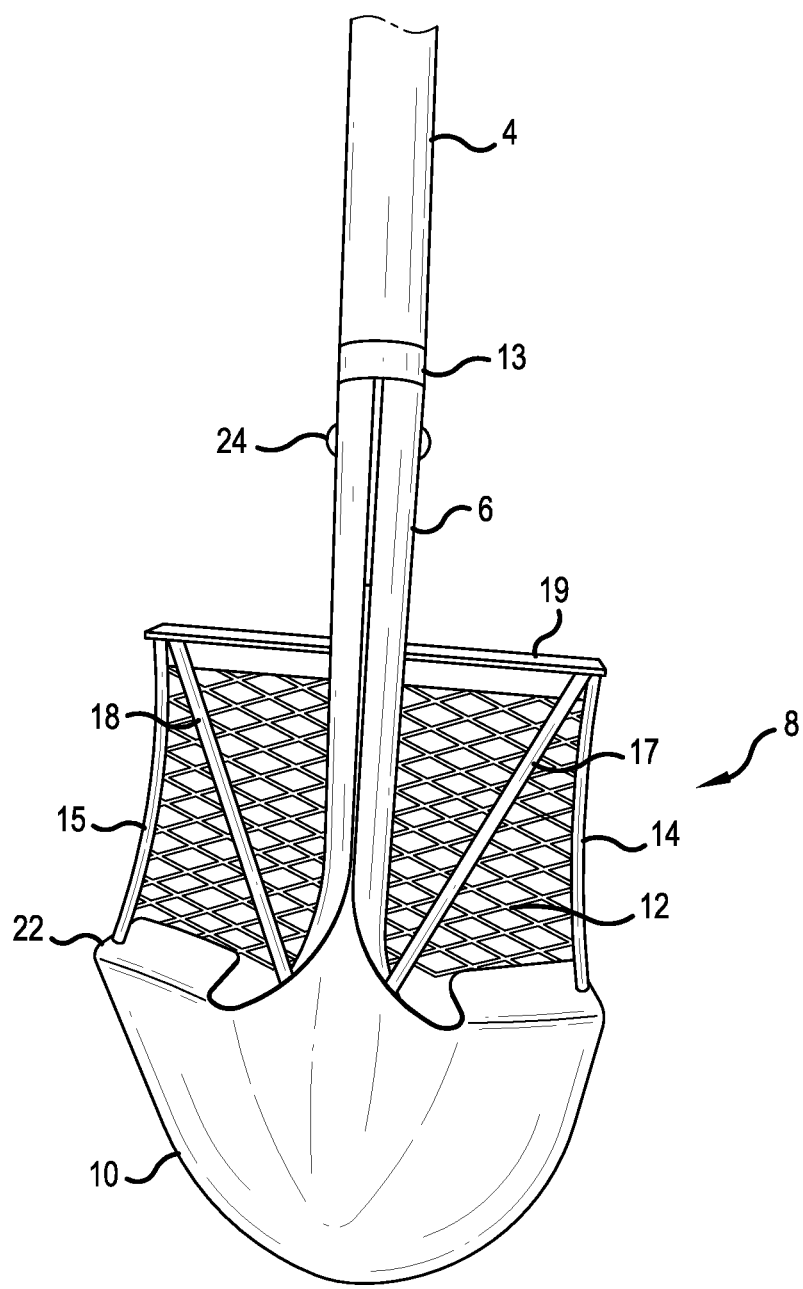
FIG. 3 is a rear perspective view of the shovel grate and blade in the same embodiment.
Figure 4:
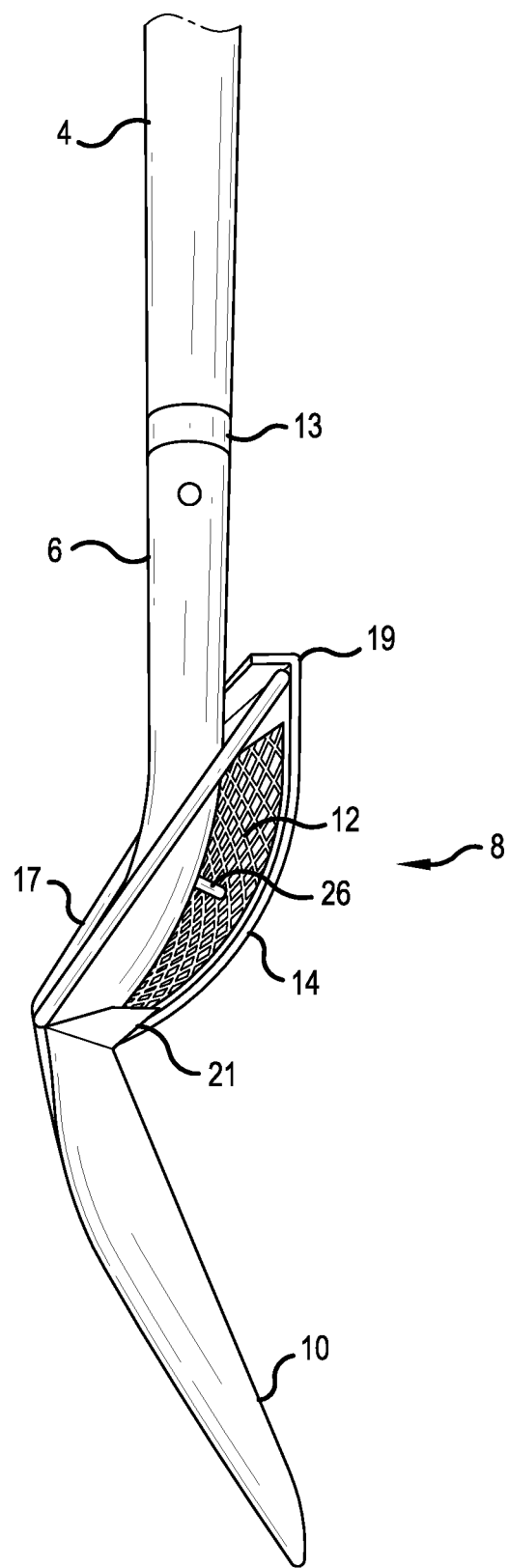
FIG. 4 is a side perspective view of the shovel grate and blade in the same embodiment.

FIG. 1 has items shown in FIGS. 2-4 not marked for simplicity. FIG. 1 illustrates a shovel assembly 1 having a grip 2, a shaft 4, a collar 6, a grate 8, and a blade 10. The shaft 4 is connected to the grip 2 and the collar 6, which envelops the shaft 4. The blade 10 is mounted onto the shaft 4 through the collar 6, which is secured by a rivet (not marked) through the shaft 4. The grate 8 is connected to the blade 10 and the collar. FIGS. 2-4 show further detail of the shovel assembly in FIG. 1 from different views. FIG. 2 has a collar ring 13 that covers the end of the collar 6 for a smooth collar-shaft connection and protects the users from the edges of the collar. Blade 10 has a blade tip 20 and a collar connection area 22 in which the collar 8 extends from the blade in a continuous piece of material. This collar connection area 22 could, in a different example, be where separate pieces of blade materials and collar materials are connected. The grate 8 has an abrading surface 12 on which a rootball thinning motion can be performed. In this example embodiment, the abrading surface 12 is welded to and supported on the sides by side supports 14, 15 and may optionally include spacer support 26 located between the abrading surface 12 and the collar 6. The abrading surface is welded to the blade 10 at blade top 22 (not shown in FIG. 2) and to the collar 6 at a top piece. In this example, the top piece is an optional kickplate 19. The grate is structurally connected by a connector to the shaft 4. Blade top 22 can optionally include a second kickplate. The connector in this example is the combination of the kickplate 19, cross support rods 17, 18, collar 6, rivet 24, spacer support 26.

Not shown, the kickplate (also known as a step plate) can have a high friction surface or other surface features like punched holes, completely or incompletely punched, or protrusions in the direction of the shaft end to increase traction between the user's foot and the kickplate surface facilitating use, especially when the surface is wet. The kickplate might be placed at different heights depending on the end user. In addition to the kickplate, the shovel blade can have a forward or backward step for an additional surface the user can kick or to which to attach the grate.

The example in FIGS. 1-4 includes a tempered steel round-point blade, a fiberglass shaft, a rubber grip, an outwardly facing curved piece (focus of convexity is on the tool side) of expanded steel for the abrading surface of the grate, and steel rods angled relatively to the shaft for cross supporting the grate welded to the grate's kickplate and the top of the blade, and curved pieces of steel welded to and supporting the curved sides of the abrading surface.

Figure 5:
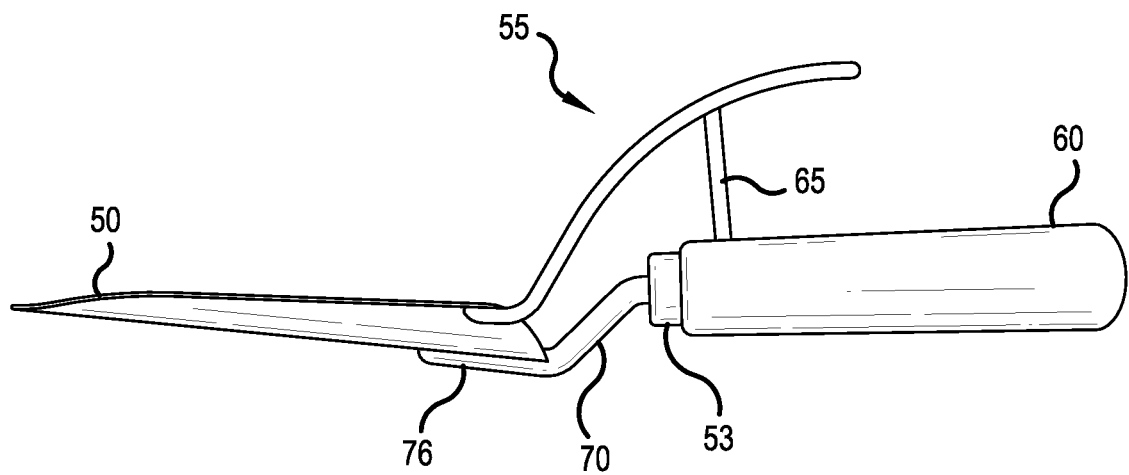
FIG. 5 is a side perspective view of a shovel with a grate in a second embodiment example showing a handheld shovel.
Figure 6:
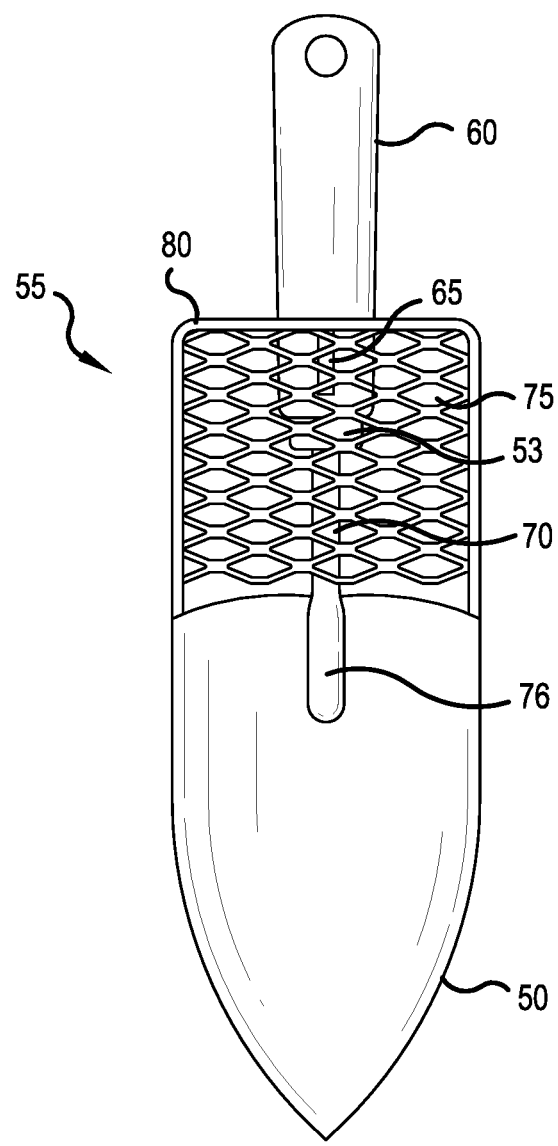
FIG. 6 is a front perspective view of a shovel with a grate in the second embodiment.
Figure 7:
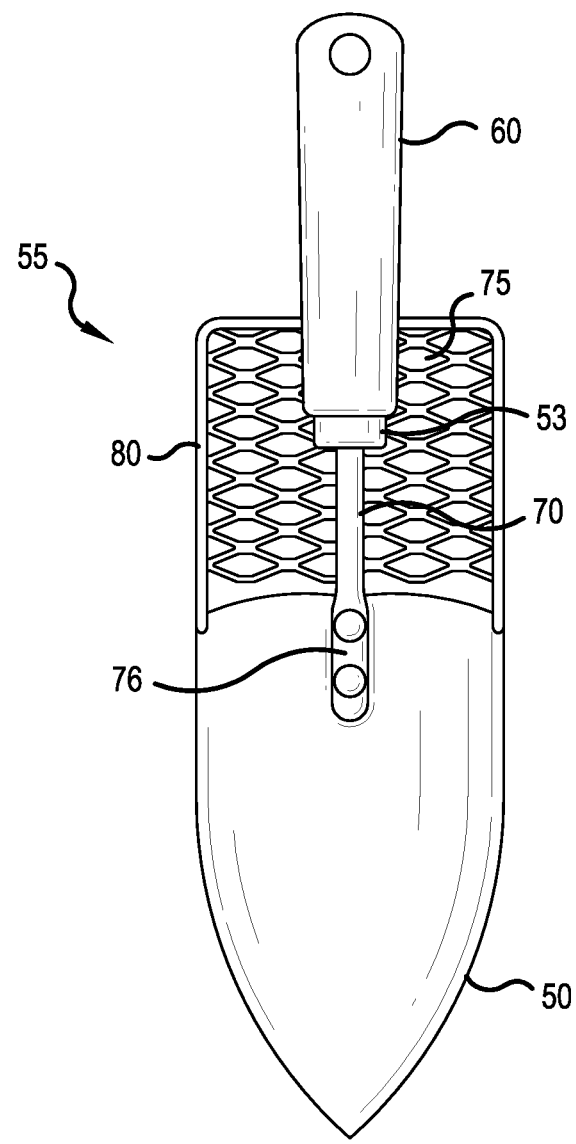
FIG. 7 is a rear perspective view of a shovel with a grate in the second embodiment.

FIGS. 5-7 illustrate a handheld embodiment intended where a user might work in a flower bed or otherwise use a handheld shovel or trowel. The user would hold grip 60, which also functions as the shaft. The blade 50 is connected to the grip 60 through connecting piece 70 and ring 53. The blade has a weld 76 where it is secured to connecting piece 70. The grate 55 has an abrading surface 75 that is welded to outer edge support 80. Outer edge support 80 can be welded to or integral with the blade 50. Note there can be a gap between the abrading surface 75 and the blade 50 so that soil, which does not fall back through the abrading surface, can be directed to be collected on the front of the blade and placed wherever the user desires. As shown in FIGS. 5 and 6, the abrading surface 75 can be secured to rod support 65, which can be secured into the grip 60.

The embodiments in FIGS. 1-7 utilize welds for metal-to-metal joining. Alternative methods of fastening and securing such as adhesives, screws, clamps, rivets and other known fastening methods can be utilized by a person of ordinary skill in the art to build different alternatives within the scope of the claims.

Figure 8:
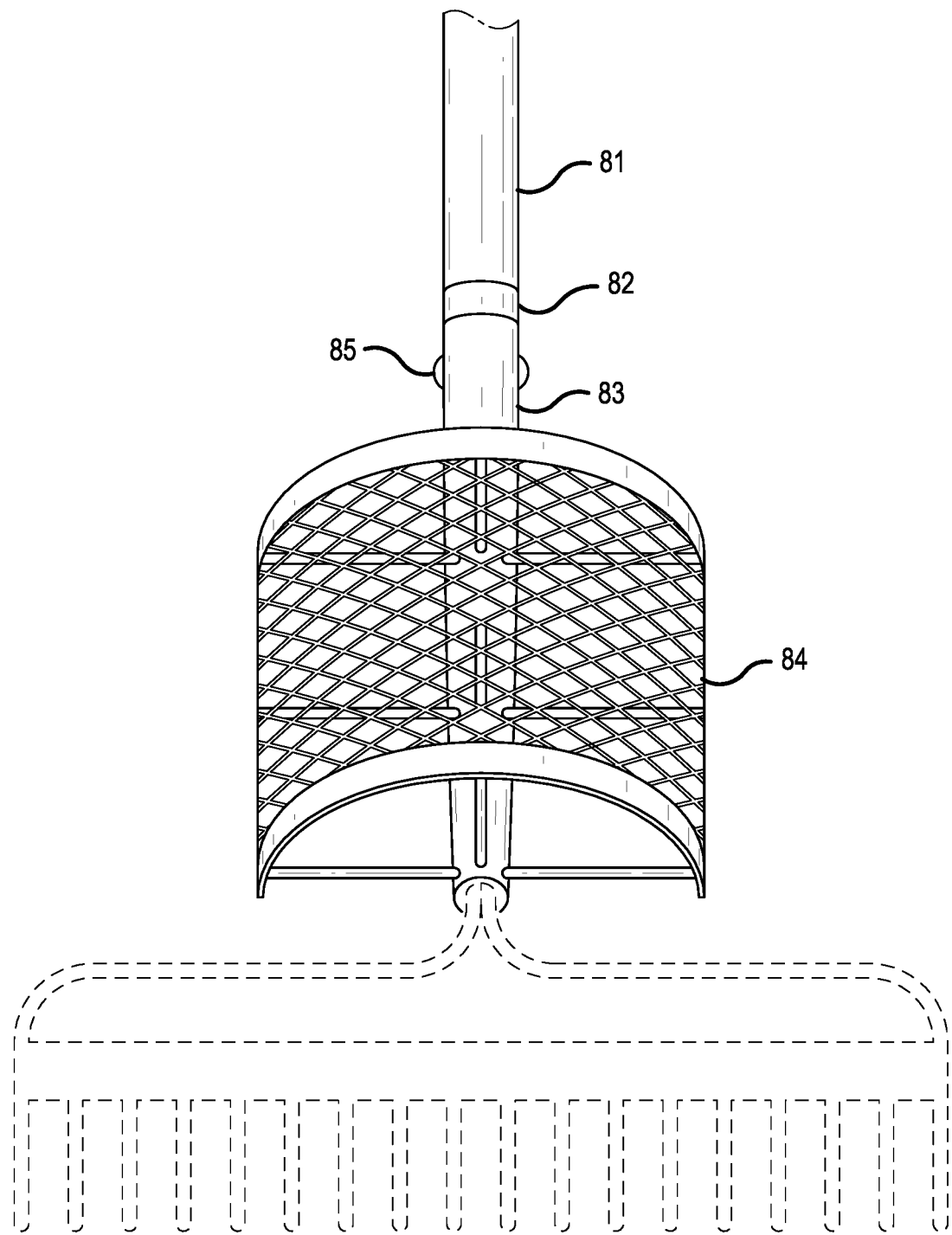
FIG. 8 is a perspective view of a grate attachment connected to a garden tool shaft in a third embodiment example.

FIG. 8 illustrates a grate attachment 84 on a generic garden tool shaft 81. This grate attachment 84 could be bought at the store by a user and then connected to the shaft 81 by a collar 83 and collar ring 82. To connect the grate attachment 84 on the garden tool shaft 81, a user could drill a hole into the shaft 81 and then affix and secure the collar 83 by inserting at least one fastener 85 through the collar 83 and shaft 81. Fastener 85 could be, among other things, a screw with a washer and nut or a bolt with a clamp. The grate attachment is shown connected by various structures to the collar 83. The grate attachment could be connected in other ways and with other structures that appropriately consider the tool's use requirements and the location that user needs to direct the reclaimed soil, as well as the typical market preferences for garden tool shafts. The grate attachment can be part of an assembly that includes a shaft and/or a garden tool head like a shovel blade. FIG. 8 shows the grate attachment mounted on a shaft. It is envisioned that a shovel blade and grate attachment may be manufacturing together for lighter weight shipping and cheaper sales than a full shovel, and the shaft can be added or replaced by a user when needed.

One of ordinary skill in the art will appreciate that different forms and methods of attachments and supports will be utilized to attach the grate attachment to various garden tools. The shaft location and position for the grate attachment would need to be adjusted for each type of garden tool to be practically implemented. In addition, a wheelbarrow's outer rim or handle extending from the wheelbarrow can be considered a shaft within the scope of the claims. Optionally and alternatively, the grate can be cantilevered relative to the shaft. The grate can be supported by struts, rods, and other structural forms. The blade and/or grate may have a collar or may connect directly or indirectly to the shaft without a collar.

The grating area on the grate is the site on the shovel or tool where the rootball thinning motion is performed. The rootball thinning motion, as discussed above, is created when the user places the rootball on the abrading surface in the grating area, applies pressure and repeatedly drags a rootball across the abrading surface. Because of the rootball thinning motion, soil easily separates from the rootball of the plant until substantially only the roots remain. The grate is configured to withstand the physical forces a rootball thinning motion repeatedly. This can be achieved in a variety of ways which a person of ordinary skill in the art will appreciate. For example, a stiffer and tougher abrading surface created by thicker gauge materials or materials selection. Additionally or alternatively, the abrading surface that is supported by additional materials on the edges or supports on or below the abrading surface to help it retain its shape and/or the shape can be made to increase the strength. The abrading surface can also be held in tension to make a surface stronger and more durable.

The grating area contains an abrading surface and may or may not be between surrounded by a non-abrading edge or edge support. It may be desirable to protect the user from the edges of the abrading surface and therefore a protective material may be placed over, outside or around the edges. Additionally or alternatively, a structural support that supports the grate's structure and/or the abrading surface may enclose the abrading surface. The grating area may have different angles relative to the shaft or shapes or raised areas. Another alternative is if the edge support can assist in the abrading activity through additional abrading like surface or knife-like protrusions for speeding up the rootball breakdown.

It is envisioned that the grate/grate attachment can be used with a wide variety of now existing or later arising shovels and garden tools. Examples of such shovels and garden tools are described herein. The shovel can have the variation of known garden shovels and reasonable equivalents. For example, the shovel may have no grip, a shaft-shaped handle extending from the shaft, a handle as shown in FIGS. 5-7, a d-type handle, a t-type handle, wrapped, plastic, rubber, foam, or other known grips. It is envisioned that all sizes of shovels can be adapted to the grates herein including a handheld shovel embodiment shown in FIGS. 5-7.

The shovels described herein should be useable for digging and can have a wide variety of other functions. These functions can include, but are not limited to, scooping, lifting, trenching, excavating, post hole digging, edging, potting, digging, transplanting, clearing, draining, scraping, planting, chipping, cutting, lifting and outdoorsman/survival tooling. A shovel built for scooping ashes, e.g., in a crematory, would not be construed as useable for digging.

The shovel or garden tool shafts types can be a variety of materials. These shaft materials include wood, composite, fiber glass, metal (e.g., aluminum), plastic or some other material with appropriate stiffness/toughness, corrosion resistance, and weight for digging, rootball thinning and their intended functional application. The shaft can also be different lengths, weights and shapes for different types of users (e.g., short, tall, strong, weak, and special needs) and intended functional applications.

The blade can take various tips and shapes as well. The blade tips and shapes include round, flat, tapered, square, scoop, pointed, a combination of these, or other known or later arising single purpose or multipurpose blade types. A blade tip is useable for digging if it is designed to interface with the soil and strong enough to sustain a digging motion. Note that a blade useable for digging may be optimized for performing other functions. The blades can have different sizes, weights and thicknesses to accommodate different user types and intended functional applications.

Figure 9A:
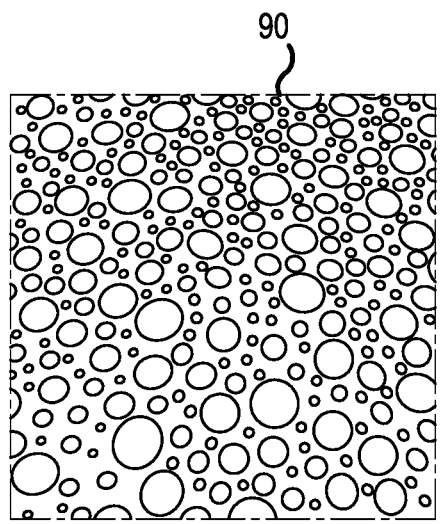
FIGS. 9A-9D are close up views of different types of gratings.
Figure 9B:
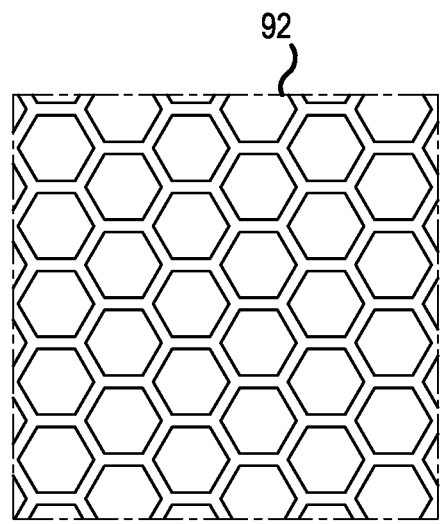
Figure 9C:
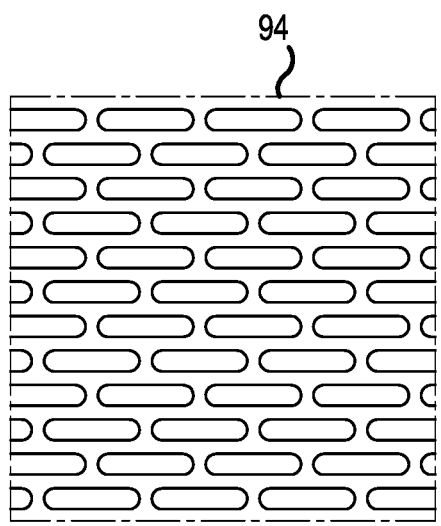
Figure 9D:
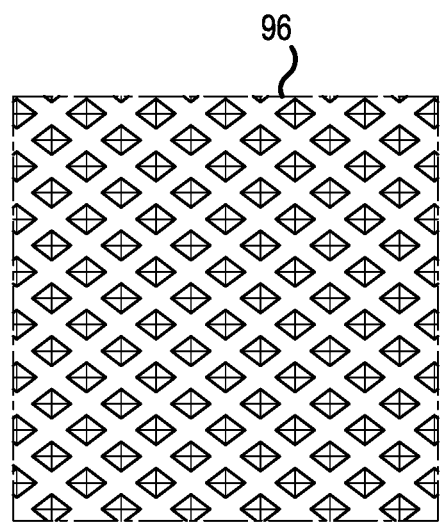
Figure 10:
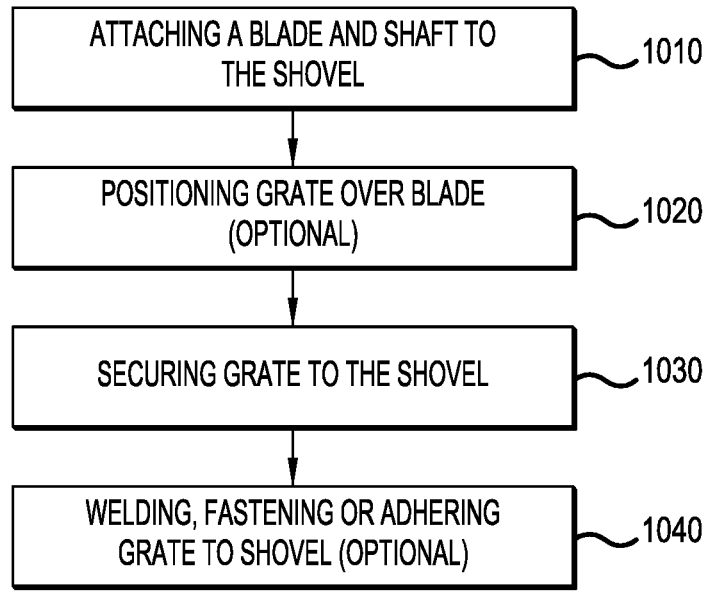
FIG. 10 is a flow chart illustrating a method of manufacturing.
Figure 11:
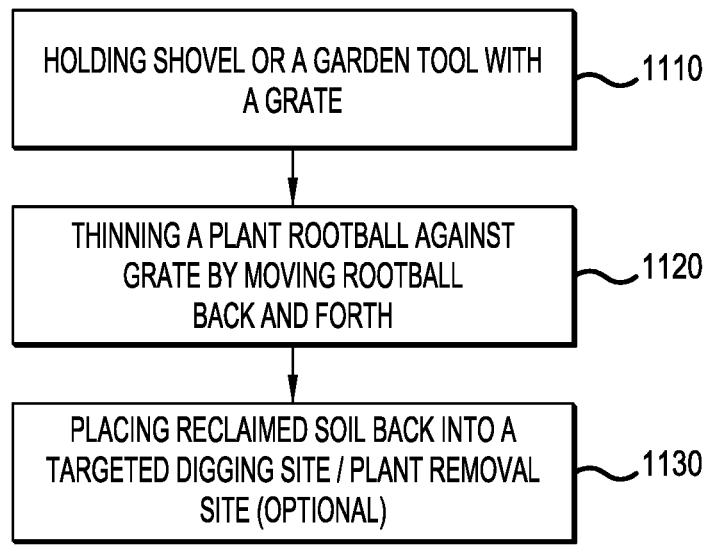
FIG. 11 is a flow chart illustrating a method of use.

The abrading surface is chosen to efficiently extract reclaimed soil from the rootball. The material selected for the abrading surface is ideally something suitable for a garden tool usage that has high stiffness, toughness for repeated use and resists corrosion. FIGS. 1-8 show expanded metal as an exemplary abrading surface material. FIGS. 9A-9D show exemplary abrading surface materials other than expanded metal. Examples of grate materials might be metals such as steel, plastics, composites, and natural materials. Natural materials may include wood, sea urchin, rocks and sea shells. The form of the abrading surfaces would have at least one edge or protrusion, and preferably many edges or protrusions, for gripping into the rootball and helping to break it down. Examples of abrading surfaces forms are expanded metal, wire mesh, perforated sheets, slotted filter sheets, pulled or cross fibers, pot netting and other shapes or pattern that would provide efficient grating surfaces this purpose that a person of ordinary skill in the art would understand and consider. FIG. 9A is a perforated sheet of metal with various size holes. FIG. 9B is hexagonal shaped perforated sheet of metal. FIG. 9C is slotted perforated sheet of metal. FIG. 9D is a grid of spiky protrusions with channels. The hole size, protrusion size, edge sharpness, and void-to-surface ratio can vary based on the materials selection and the type of soil. To efficiently extract the material from a root with ease, it is beneficial for as much of the surface that is intended to contact the rootball to be an edge or a protrusion.

Once the reclaimed soil is removed from the rootball, another goal is to intentionally direct where the reclaimed soil is placed. The abrading surfaces can have voids or channels to catch and direct the reclaimed soil. An example of a surface with channels would be a corrugated metal with linear channels or another surface arranged protrusions (e.g., spikes as shown in FIG. 9D). The voids or channels intended to direct the reclaimed soil are configured in a position where the reclaimed soil can be intentionally directed to a desired area selected by the user. An example is when the abrading surface is placed directly over the front of the shovel spade such that the reclaimed soil resulting from a rootball thinning motion on the abrading surface falls along or through the abrading surface to the front of the shovel blade, enabling the user to direct the reclaimed soil into the hole created by the extraction of the rootball or into a wheelbarrow to be reused elsewhere.

The connector connects the grate attachment to the shaft and could include, among other things, a collar or other fastening mechanisms as well as various strengthening and positioning supports to help the functionality of the grate attachment. The blade and/or grate attachment may have a collar upon which the blade and/or grate attachment can be mounted onto a shaft. The shaft may optionally have a garden tool shaft connection where the shaft screws into the collar or vice versa. The connection may instead be a clamp around the shaft or a bolt through a shaft. One of ordinary skill in the art will appreciate other means to mount a grating attachment onto a shaft with or without the use of a collar, and such means will work as well.

Optionally, the top of the grate and/or top of the blade can have additional features for ease of shovel use such as a kickplate or flat surface upon which a user can apply extra force with his or her foot to enhance the digging motion.

The grate and/or grate attachment may be shaped to bend convexly over the shovel or tool with the bend line being parallel to the ground when the shovel is held upright. In this way, the user can direct the reclaimed shovel downward to a specific point on a garden tool like a shovel blade or other tool area. Different bend angles are possible. A 5-50 degree bend angle on a porous abrading surface provides a good balance of abrading surface coverage for contacting the rootball while optimizing collection of reclaimed soil through the voids into a specific point. A very sharp angle would encourage a point or linear contact touching the rootball, which minimizes the abrading surface contact and causes a large portion of the reclaimed soil to end up on the same side of the grate as the rootball—whether the reclaimed soil falls on the rootball side may not be useful in every application. When the abrading surface is protrusion based with channels, an angle of 0-20 degrees bend on the abrading surface is most useful to maximize contact with the rootball while not affecting the channels. While angles of bend could be connecting two flat pieces that connect at a rounded angle, the surface can also be a continuous curving convex surface to approximate such a bend angle. A different example would be a grate attachment that radially wraps around at least some of the shaft and is supported by supports extending from the shaft to the grate area. This grate could be mounted at any height along or overhanging the shaft or collar. This example has the benefit where it doesn't matter on which side of the tool the user stands and can be adjusted to any user's height and comfortable grating position. This example would be well suited to a post-hole digger or other garden tool where the specialized head of the tool is not particularly suited for catching the reclaimed soil.

Other shaft-based common garden tools that interface with soil are envisioned for use with this grate attachment. Examples include digging bars, hoes, trowels, garden fork, and cultivators and a wheelbarrow. On a wheelbarrow, the grate may be located above the wheelbarrow's holding area to collect the reclaimed soil, or outside of the holding area so that a batch of rootballs can be thinned directly over a desired area.

On a post-hole digging shovel with two shafts, the placement options of the grate may be limited by the interaction of the two shafts. The grate can be designed to fit unhindered within the shafts' mobility or positioned outside of the shafts. If the user desires the soil to fall between the shafts, depending on the grate position, the user can be instructed to hold the shovel a certain way to direct the soil flow.

The grate attachment may also be mounted and positioned on or over the side or over a wheelbarrow so that that reclaimed soil intentionally falls within or outside of the wheelbarrow, depending on whether the user intends to use the wheelbarrow for collecting the soil or the thinned rootball remains respectively.

In addition to apparatus embodiments herein, an exemplary method is also included to manufacture a shovel described herein and a method of using a shovel or grate attachment herein. The method includes the steps 1010-1040. Step 1010 involves attaching a blade and shaft to create a shovel. This can be done through collars or other fasteners as described above. Step 1020 involves positioning a grate onto the shovel over the blade, and preferably a front of and above the blade so that soil from thinned rootballs would fall onto the front of the blade. Step 1030 involves securing the grate to the shovel using any of the mechanisms, forms and structures in this specification or their equivalents. Step 1040 is an optional step of further defining the securing of the grate to the shovel with welding, fastening, or adhering the grate to the shovel.

The method of use includes steps 1110-1130. Step 1110 involves the user holding a shovel or the tool with a grate attachment. An example is a user standing near a hole and grabbing the shaft or grip of a shovel or tool with one hand. Step 1120 involves abrading back and forth a rootball along the grate to extract soil and breakdown the rootball. The user applies pressure to force the soil out of the rootball. Step 1130 is an optional step of collecting the reclaimed soil from the rootball and directing it into a desired location such as a targeted digging site or a wheel barrow. For example, the reclaimed soil can be placed onto the front of a shovel blade. The method could also be directed to a wheelbarrow or elsewhere.

It will be apparent to those skilled in the art that various modifications and variation can be made to the disclosed shovel, tool and grate systems and methods. Other embodiments of the shovel will be apparent to those skilled in the art from consideration of the specification and practice of the disclosed method and apparatuses. Numerous modifications, changes, variations, substitutions, and equivalents will occur to those skilled in the art without departing from the spirit and scope of claimed invention. One of ordinary skill in the art appreciates that various modifications and changes can be made without departing from the scope of the claims. It is intended that the specification and examples be considered as exemplary only, with a true scope being indicated by the claims and their equivalents. The benefits, advantages, solutions to problems, and any element(s) that may cause any benefit, advantage, or solution to occur or become more pronounced are not to be construed as a critical, required, or essential features or elements of any or all the claim. Accordingly, the specification and figures are to be regarded in an illustrative rather than a restrictive sense, and all such modifications are intended to be included within the scope of the claimed invention.

Regarding additional interpretation and construction of terms and steps herein, method steps are not in any specified order unless dictated by the context or specific wording. In addition, the use of a word in the singular form should be interpreted where the context allows or does not restrict to be plural or at least one of. While some in the art may argue a shovel and a spade have different meanings, the terms as used herein will be used interchangeably as a shaft plus blade system. Wherever welding is mentioned, other metal joining alternatives like brazing would be understood by a person of skill in the art. Positional and directional terms described in this specification such as upper, lower, left, ride, side may be understood to be different than shown or described, and should not limit the variations of embodiments possible from the claimed features that a person of ordinary skill in the art would understand from the specification, figures and claims. The term "and/or" in a list means all list items present, some list items present, or one of the list items present, unless such construction is limited by the context.

INDUSTRIAL APPLICABILITY

In addition to the goals stated above, the apparatus and methods herein can be used to reduce consumption, reduce environmental effects, reclaim nutrient rich top soil, and add functionality to a garden tool.

The invention claimed is:

1. A soil conserving shovel, the shovel comprising:
    a garden tool shaft;
    a blade including
        a shaft end that is connected to a garden tool shaft,
        a front side that faces a targeted digging site during a shovel digging motion, and
        a blade tip usable for digging; and
    a grate connected to the shovel and positioned more proximal to the shaft end than the blade tip, the grate including a kick plate at a distal-most edge of the grate, with respect to the blade tip,
    wherein the grate is configured to mechanically separate debris from a rootball during a rootball thinning motion performed on the grate, the grate positioned relative to a front side of the blade so that the debris separated during the rootball thinning motion falls through the grate onto the front side of the blade,
    wherein an abrading surface of the grate is curved about an imaginary line perpendicular to the garden tool shaft, and
    wherein the kickplate is configured to receive a force exerted by a foot of a user to assist the user with the shovel digging motion.

2. The shovel of claim 1, wherein the grate is convex against where the rootball thinning motion is to be performed.

3. The shovel of claim 1, further comprising a garden tool shaft connection configured to physically connect the garden tool shaft to the blade, the grate, or both.

4. The shovel of claim 1, wherein the grate does not contact the ground during the shovel digging motion.

5. A grate attachment for retaining soil of a plant rootball, the grate attachment comprising:
    a grate including a connector and a grating area;
    the connector being physically connectable to a shaft of a soil-displacing garden tool that includes a specialized end for displacing soil or cutting plant roots and the shaft extending from the specialized end, the grate being immobilized when the connector is connected to the shaft and configured to separate debris from a rootball when the plant rootball is abraded against the grate; and
    the grating area has an abrading surface against where the plant rootball is thinned,
    wherein the abrading surface is curved about an imaginary line perpendicular to the shaft.

6. The grate attachment of claim 5, wherein the abrading surface is convex relative to the shaft.

7. The grate attachment of claim 5, wherein the abrading surface includes intermittent slats with slits in between adjacent slats.

8. The grate attachment of claim 5, wherein the abrading surface is a mesh, an expanded metal or a perforated sheet.

9. The grate attachment of claim 5, wherein the connector includes a collar that when the connector connects to the shaft the collar circumferentially surrounds at least a majority of a circumference of the shaft within the collar.

10. The grate attachment of claim 9, wherein the connector includes at least one mechanical feature configured to prevent the collar from rotating around the shaft and moving along the shaft.

11. The grate attachment of claim 5, wherein the connector is welded to the grate.

12. The grate attachment of claim 5, wherein the connector includes a bolt or a rivet that at least partially inserts into a body of the shaft.

13. A garden tool shovel assembly including the grate attachment of claim 5 coupled to a shovel blade.

14. The garden tool shovel assembly of claim 13, wherein the grate attachment is welded, brazed, fastened or adhered to the shovel blade.

15. A garden tool shovel assembly including a grate attachment for retaining soil of a plant rootball coupled to a shaft, the grate attachment comprising:
    a grate including a connector and a grating area;
    the connector being physically connectable to the shaft of a soil-displacing garden tool that includes a specialized end for displacing soil or cutting plant roots and the shaft extending from the specialized end, the grate being immobilized when the connector is connected to the shaft and configured to separate debris from a rootball when the plant rootball is abraded against the grate; and the grating area has an abrading surface against where the plant rootball is thinned, wherein the connector is adhesively set for preventing a collar at least partially surrounding the shaft from rotating around the shaft and moving along the shaft.

16. A soil conserving shovel, the shovel comprising:

a garden tool shaft;

a blade including a collar at a shaft end of the blade that connects the blade to the garden tool shaft, a front side that faces a targeted digging site during a shovel digging motion, and a blade tip usable for digging;

a grate connected to the shaft end and having at least a portion that overhangs the axis of the shaft, the grate including an abrading surface overhanging the shaft and not in direct contact with the shaft or the collar, and grate supports extending from the collar to the overhanging portion of the grate.

17. The shovel of claim 16, further comprising a kickplate at the most overhanging part of the grate that a user kicks during a digging motion.

18. The shovel of claim 16, wherein the blade further includes outer edges extending from the blade tip to the shaft end, and the shovel further comprises second grate supports extending from the outer edges to the overhanging portion of the grate.

19. A method of using a soil retaining shovel, the method comprising the steps of:

holding a shovel including a blade and a grating area, the grating area being fixed and immobilized over a targeted digging site side of the blade; and thinning a plant rootball against the grating area so that debris separated during the rootball thinning motion falls through the grating area onto the targeted digging site side of the blade.

* * * * *